Jan. 11, 1938.                A. M. STARR                 2,105,100
           FUEL METERING SYSTEM AND HOUSING FOR SAME
                       Filed Dec. 2, 1935
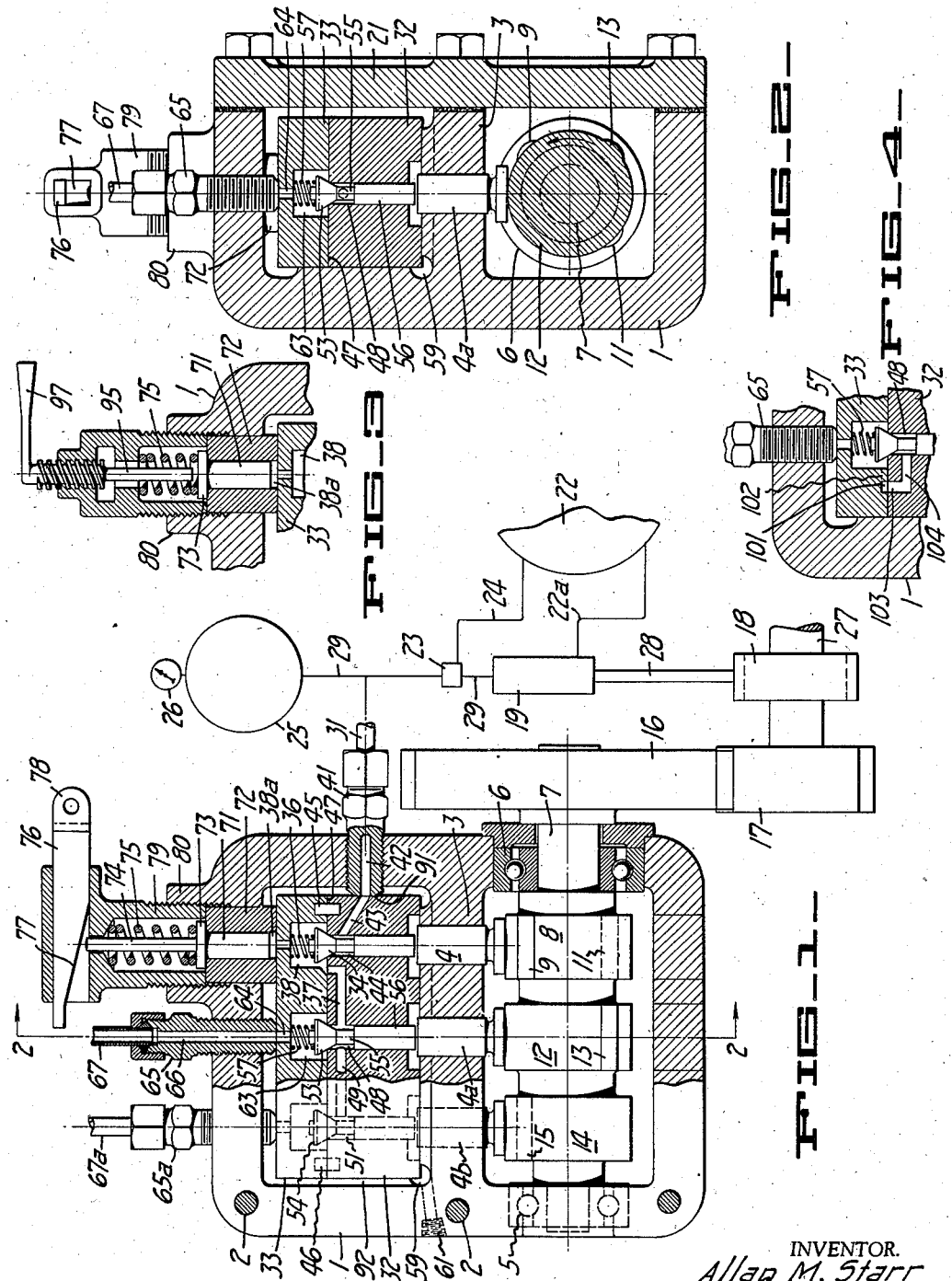
INVENTOR.
Allan M. Starr
BY Ernest J. Sweetland
                ATTORNEY.

Patented Jan. 11, 1938

2,105,100

UNITED STATES PATENT OFFICE 2,105,100

FUEL METERING SYSTEM AND HOUSING FOR SAME

Allan M. Starr, Piedmont, Calif., assignor, by mesne assignments, to Starr & Sweetland, a copartnership composed of Ernest J. Sweetland and Allan M. Starr as copartners, Piedmont, Calif.

Application December 2, 1935, Serial No. 52,463

3 Claims. (Cl. 123—137)

This invention is a continuation in part of my invention, serial No. 638,866 filed October 21, 1932 titled Internal combustion engine and relates to fuel metering systems and housings for same.

In the operation of internal combustion engines using the injection system of introducing the fuel into the cylinders it is essential to meter the fuel with extreme accuracy into individual charges for the cylinders. To meet the future demands of the industry, such an apparatus not only must be accurate and dependable, but must be of a construction that lends itself to quantity production on an economical basis. It is also of great importance to provide a construction wherein the vital parts are well protected, and at the same time are easily removable for repair or replacement. It is an object of the present invention to meet the foregoing requirements as well as the objects more specifically set forth as follows:

To provide a metering mechanism wherein a metering chamber is provided with a movable partition the movements of which are controlled directly by the operator or a governor.

To provide a housing for a metering mechanism which serves to protect it, and at the same time cooperates to secure the parts of the mechanism together to resist the internal pressure of the liquid being metered.

To provide a fuel metering mechanism having a plurality of poppet valves mounted in a block of metal which is readily separable into two or more parts to facilitate manufacturing and ease of access to the interior parts.

To provide a metering mechanism and housing for same wherein conduits in the metering mechanism align with openings in the housing to provide fluid connections and cooperate with means whereby the mechanism is secured in place.

Other objects will be understood from the following description and the accompanying drawing, of which Figure 1 is a side elevation partially in section.

Figure 2 is a sectional elevation on the lines 2—2 of Figure 1.

Figure 3 shows screw means of controlling the movements of the movable partition in place of the cam or wedge means shown in Figure 1.

Figure 4 is a fragmentary sectional view showing means of forming a fuel conduit and connections between the two members of the valve block.

Referring to Figure 1 in detail 1 is a housing provided with tapped openings 2 to receive cap screws for securing the cover 21 (Fig. 2) in place. The housing is divided by the partition 3 which is provided with drilled and reamed openings to receive the cam-followers 4, 4a and 4b. At the sides of the housing are suitable openings to receive the ball bearings 5 and 6, and in these bearings is mounted the shaft 7 which carries the cams 8, 12 and 14. The shaft 7 is driven in proper timed relation with the engine through the gear 16 and pinion 17. The shaft 27 which drives the pinion 17 also drives the eccentric mechanism 18 which actuates the piston 28 of the pump 19 which draws fuel from the tank 22 through pipe 22a and forces it under suitable pressure into the accumulator tank 25 through conduit 29. Tank 25 is provided with pressure gauge 26. The numeral 23 represents an unloading, or relief valve, which discharges the surplus capacity of the pump through conduit 24 into supply tank 22 after the desired pressure has been reached in tank 25.

Resting upon the partition 3 of the housing is what I term the block of the metering mechanism. This comprises two sections 32 and 33 which are preferably made of hardened steel. The dowels 45 and 46 serve to align the blocks 32 and 33 while they are being secured in place. The parts 32 and 33 while in the casing are held tightly together by means hereinafter described, to form a fluid-tight joint between their ground and lapped surfaces along the line 47; but they may readily be separated when removed from the casing. The valves and springs within the block are therefore readily accessible as soon as the block is removed from the housing.

The inlet fitting 41 is provided with passageway 42 which aligns with conduit 43 to provide entrance of the incoming fuel into chamber 44, and the chamber 38 communicates with the injector valve chamber 48 through conduit 37, and conduit 49 communicates with chamber 51 of the next injector valve.

The mechanism herein shown is designed for a two cylinder engine; but it will be understood that the same principles apply for any number of cylinders by providing the number of injector valves and cams to suit the number of cylinders to be served. In the event of there being more than two cylinders the next injector valve chamber would be connected with chamber 51 in the same manner that chamber 48 is connected with 51 and so on. In the event of a one cylinder engine the construction would be as shown except that cam 8 would have but one lobe and cam 14, valve 54 and attendant parts would be omitted.

Each injector valve, as 53, is connected by the neck 55 with the stem 56, which is lapped or otherwise closely fitted in the hole through the block 32, so that it can slide freely up and down to open and close the valve without permitting excessive leakage around the stem. However, the groove 59 which leads to the drip-off opening 61 is provided to take care of any slight leakage that might occur.

Each injector valve is provided with a spring, such as 57, to urge the valve toward its seat and the chamber 63 surrounding the valve is provided with the opening 64 which through the conduit 66 in the fitting 65 communicates with conduit 67 which leads to an injector nozzle (not shown).

71 is a piston, or movable partition, which is ground and lapped to a close sliding fit in the bushing 72 which is a free fit in the opening in the housing 1. This is held in place by member 79 which is threaded into the boss 80. The piston 71 is provided with a flange 73, the lower side of which acts as a stop to limit the downward movement of the piston. The stem 74, which may be integral with the piston 71 and flange 73, protrudes through an opening in the top of member 79, and this stem through contact with the sloping surface 77 of the slide 76 governs the upward travel of piston 71. Through the clevis 78 the slide is connected to a suitable throttle lever or other desired control means, either manual or automatic. The spring 75 firmly holds the piston 71 in its extreme downward position except when the pressure in chambers 38 and 38a overcomes the force of the spring and causes the piston to rise.

A feature of novelty is the means I employ in making fluid connections with the blocks 32 and 33 from the outside of the housing, which means also serves the purpose of holding the blocks firmly in place. This is accomplished as follows: The fitting 41 abuts against a ground surface 91 on the end of block 32 thereby forcing the block firmly against the stop 92 and at the same time effectively connecting conduits 42 and 43 to form a fluid-tight joint. Similarly the lower faces of the fittings 65 and 65a are forced against the ground surface of the upper side of the block 33, simultaneously holding blocks 32 and 33 together and forming fluid-tight joints with the conduits such as 66. The blocks 32 and 33 are further held by the bushing 72 the lower face of which makes a tight joint against the upper surface of block 33 and forms the leak-proof chamber 38a.

The cam 8 which actuates follower 4 is a two-lobe cam with the lobes 9 and 11 set opposite each other, whereas the cams 12 and 14 each have but a single lobe and these are set at an angle of 90 degrees to the lobes of the cam 8 so that the metering valve 34 is caused to open and close prior to the opening and closing of each of the fuel injector valves 53 and 54. From this it will be understood that whatever number of cylinders the injector is designed to serve there is a corresponding number of lobes on the cam 8, and that the cams controlling injection into the engine cylinders have their lobes disposed intermediate of the lobes of the cam 8 which may be called the metering cam.

As the parts in Fig. 2 bear numerals corresponding to those used on similar parts in Fig. 1 the functions of the parts shown in this figure will be understood from the preceding description.

Figure 3 shows a modified form of control that may be used in place of the mechanism shown in Fig. 1. In this figure the upward movement of the piston, or movable partition 71 is controlled by the rod 95 the upper portion of which is provided with a thread which raises or lowers the rod when it is caused to rotate by the lever 97. This lever may be connected by any suitable means to a pedal or hand lever, or to an automatic control mechanism.

Figure 4 is a fragmentary portion of a vertical section corresponding in position to the section illustrated in Figure 2. This view illustrates a modified means of forming fuel conduits for conveying fuel from the chamber 38 (Figure 1) to chambers such as 48 and 51 underneath the injector valves. In this modified form the block 33 is provided with a groove or channel 101 which is milled lengthwise into the surface of the block and by means of a lateral channel 20 represented by the dotted line 102 connects with the metering valve chamber 38. In the lower block 32 a vertical conduit 103 opens into the channel 101 and by means of the lateral conduit 104 communicates with the chamber 48. When this construction is used, the channel 101 extends along the valve block to a point opposite the last valve in the series, and conduits such as 103 and 104 form communication with each of the chambers such as 48 and 51. This arrangement of conduits, coupled with the distributing channel 101 and the connecting channel 102 takes the place of and serves the same purpose as conduits 37 and 49 in Figure 1 and has certain structural advantages from a production standpoint. The ground surfaces which form a joint between the blocks 32 and 33 cooperate to make the channels 101 and 102 a leak-proof conduit when the parts are tightly held together by means of the screw fittings such as 65, and the bushing 71.

The operation of the injector and attendant parts is as follows: The pump 19 draws the liquid fuel from supply tank 22 through pipe 22a and forces it through conduit 29 into accumulator tank 25. The pressure in tank 25 is governed by the setting of the relief valve 23 which is adjusted to suit the requirements of the engine being served by the injector. This pressure may be of the order of two thousand pounds per square inch; but my system is applicable to both higher and lower pressures. Through the conduit 31 which is in open communication with conduit 29 the fuel is conducted through conduits 42 and 43 into chamber 44.

In a four cycle engine the shaft 7 is geared to make one revolution for every two revolutions of the crank shaft so that a charge of fuel is metered through each of the conduits 67 and 67a at alternate intervals for each revolution of the shaft 7. When the lobe of the cam 8 raises the follower 4 the valve 34 is opened, admitting fuel under pressure into the chamber 38 which is in open communication with chamber 38a. Since the pressure of fuel against the lower face of the piston, or movable partition, 71 exceeds the pressure exerted by spring 75, piston 71 is raised until the top of rod 74 contacts with the sloping surface 77 of the slide 76 which acts as a stop and prevents further rise of piston 71. The lobe 9 quickly passes from under the follower 4 when the spring 36 assisted by the pressure within chamber 38 causes the valve 34 to close. At this phase of the cycle the piston 71 is raised and the downward pressure of spring 75

75 maintains a pressure upon the fuel in chambers 38 and 38a. As the rotation of the shaft 7 progresses the lobe 13 of the cam 12 causes the valve 53 to open relieving the pressure in chamber 38 which instantly results in spring 75 forcing piston 71 downwardly to the end of its stroke, where it is stopped by the flange 73 seating against the top of the bushing 72. This rapid downward movement of piston 71 forces a measured charge of fuel through the conduits 64, 66 and 67 to be sprayed into the engine combustion chamber through any suitable type of injector nozzle which may be of the spring-loaded type, or any other appropriate variety.

Following the closing of valve 53 the lobe 11 of cam 8 opens the metering valve 34 admitting another charge into chamber 38, again causing the piston 71 to rise. This in due course is followed by lobe 15 lifting the follower 4b to open the valve 54 when the piston 71 is again forced down by the spring 75 to force a measured charge of fuel through conduit 67a to its associated injector nozzle and combustion chamber. Thus it will be seen that the cylinders of the engine alternately receive accurately metered charges of fuel, the volume of which is governed by the position of slide 76 and the resultant displacement of piston 71.

In modern multiple cylinder internal combustion engines it is highly desirable to supply a metering system in compact form, with few high pressure fittings not only for economy of manufacture and convenience in installation, but because it is necessary that the conduits connecting the various parts be as short as possible. In my novel arrangement this object is fully realized, and at the same time the two-part block which carries the valve members greatly facilitates lapping the openings for the valve stems and grinding of the valves. Furthermore, all of the valve parts are contained in the two-part block unit which is interchangeable with other similar units whereby replacements can be made with a minimum delay in operation of the power plant. When it is desired to grind the valves the block unit is removed from the housing, the upper block 33 lifted off, when all of the valves are exposed in the most advantageous possible position for regrinding.

It will be understood that the novel manner in which the housing is made to cooperate with the block unit construction makes it possible, not only to hold the block members together to resist high pressures, but to make all fluid connections in a secure, leak-proof manner without the necessity of any threaded openings in the blocks.

It is essential that the passages from the accumulator 25 to the valve 34 and the passage between valves 34, 53 and 54 be as short as possible so that the inertia and the elasticity of the fuel will have as little effect as possible on the operation of the system. By grouping these valves all into one block as shown in the drawings the passages are very short and as there are no fittings, the volume of fuel between the valves is very small. Therefore the novel and compact arrangement of the two part block held together by the fittings through the case is a very important feature of this fuel system.

Where the term "fuel injector valve" is used in the following claims it is intended to mean a valve in a fuel metering mechanism to control the admission of fuel to an engine combustion chamber, or engine cylinder, and is independent of any valves external to said mechanism such as spring loaded valves that may form an integral part of certain injector nozzles and the like.

While I have illustrated a piston type of movable partition (71) I do not limit myself to this form, and I may substitute in its place a diaphragm or other form suited to the requirements as set forth.

I claim:

1. A fuel metering mechanism comprising a casing; a horizontal partition to divide said casing into two compartments; a cover plate substantially at right angles to said partition; a cam shaft mounted within one of said compartments; a valve housing and valves removably mounted in the other of said compartments; a plurality of cam followers mounted in said partition to form an operative connection between said cams and said valves; conduits in said valve housing controlled by said valves; screw operated clamping means passing through said casing to clamp said valve housing in operative position; conduits through said screw operated clamping means to align with conduits in said valve housing whereby clamping said housing in operative position within said casing automatically connects the conduits in said valve housing with the conduits in said screw operated clamping means.

2. A fluid metering mechanism comprising a housing; a partition in said housing; a cam shaft on one side of said partition; a plurality of cam followers slidably mounted within said partition and in operative alignment with cams on said cam shaft; a cover-plate to enclose a side of said housing; a fluid-metering block on the side of said partition opposite said cam shaft; a plurality of metering valves mounted in said block in operative alignment with said cam followers; screw means for securing said block in said housing; an opening in said housing to receive a cylindrical casing; a metering piston slidably mounted in said casing; means exterior to said housing to secure said casing in sealed union with said block.

3. A fluid metering mechanism comprising a housing; a fluid-tight partition to separate said housing into two distinct parts; a cam shaft with cams in one of said parts; a plurality of cam followers slidably mounted in said partition and communicating with the other part of said housing; a fluid metering block having a plurality of valves mounted in operative alignment with said followers on the side of said partition opposite said cam shaft; a cover plate forming a joint with one side of said housing; a ground surface on one side of said fluid metering block substantially in alignment with the valves therein; a plurality of screw fittings threaded through a wall of said housing for securing said metering block in position, certain of said fittings being provided with fluid conduits whereby fluid connection is automatically made with said block when same is tightened into place by said screw fittings.

ALLAN M. STARR.